United States Patent
Senba

(10) Patent No.: US 11,760,200 B2
(45) Date of Patent: Sep. 19, 2023

(54) ELECTRIC POWERED VEHICLE WITH MAXIMUM SPEED LIMITING DEVICE

(71) Applicant: TOYOTA JIDOSHA KABUSHIKI KAISHA, Toyota (JP)

(72) Inventor: Yoshiyuki Senba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/238,973

(22) Filed: Apr. 23, 2021

(65) Prior Publication Data

US 2021/0370770 A1    Dec. 2, 2021

(30) Foreign Application Priority Data

Jun. 2, 2020  (JP) .................................. 2020-096427

(51) Int. Cl.
| | | |
|---|---|---|
| B60K 31/00 | (2006.01) | |
| B60L 15/20 | (2006.01) | |
| G01C 21/00 | (2006.01) | |
| B62J 45/20 | (2020.01) | |
| B62J 45/41 | (2020.01) | |

(52) U.S. Cl.
CPC .......... B60K 31/0008 (2013.01); B60L 15/20 (2013.01); B62J 45/20 (2020.02); B62J 45/41 (2020.02); *B60K 2031/0091* (2013.01); *B60L 2200/12* (2013.01); *B60L 2240/12* (2013.01);
(Continued)

(58) Field of Classification Search
CPC ........ B60K 31/0008; B60K 2031/0091; B60L 15/20; B60L 2200/12; B60L 2240/12; B60L 2240/62; B60L 2240/80; B60L 2200/24; B60L 3/0015; B60L 3/08; B60L 2240/622; B60L 2260/32; B62J 45/20; B62J 45/41; B62J 27/00; G01C 21/3804; B62K 3/002;
(Continued)

(56) References Cited

U.S. PATENT DOCUMENTS 8,909,388 B1 * 12/2014 Kim ...................... B60W 30/18
                                                    701/1
2016/0159240 A1 * 6/2016 Tseng ...................... B60L 53/14
                                                    320/155
(Continued)

FOREIGN PATENT DOCUMENTS

| JP | 2012-11886 A | 1/2012 |
|---|---|---|
| JP | 2018-062282 A | 4/2018 |

*Primary Examiner* — Geepy Pe
*Assistant Examiner* — Sean Patrick Reidy
(74) *Attorney, Agent, or Firm* — Oliff PLC

(57) ABSTRACT

An electric powered vehicle may include a maximum speed limiting device. In the first mode, in a case where the distance is shorter than a first reference value, the maximum speed is limited to a value lower than the maximum speed applied when the distance is longer than the first reference value. In the second mode, in a case where the distance is shorter than a second reference value, the maximum speed is limited to a value lower than the maximum speed applied when the distance is longer than the second reference value. In a case where the distance changes from a value shorter than the first and second reference values to a value longer the first and second reference values, the maximum speed limiting device increases the maximum speed at an earlier timing in the second mode than in the first mode.

3 Claims, 13 Drawing Sheets

(52) U.S. Cl.
CPC ....... *B60L 2240/62* (2013.01); *B60L 2240/80* (2013.01); *G01C 21/3804* (2020.08)

(58) Field of Classification Search
CPC ..... B62K 2204/00; Y02T 10/72; Y02T 90/16; B62M 6/45
USPC .......................................................... 701/22
See application file for complete search history.

(56) References Cited

U.S. PATENT DOCUMENTS

| | | | |
|---|---|---|---|
| 2020/0047754 A1* | 2/2020 | Ohmura | B60R 21/00 |
| 2020/0257301 A1* | 8/2020 | Weiser | G06N 3/02 |
| 2021/0123526 A1* | 4/2021 | Inoue | B60K 6/387 |

* cited by examiner

ELECTRIC POWERED VEHICLE WITH MAXIMUM SPEED LIMITING DEVICE

CROSS-REFERENCE TO RELATED APPLICATION

This application claims priority to Japanese Patent Application No. 2020-096427 filed on Jun. 2, 2020, the contents of which are hereby incorporated by reference into the present application.

TECHNICAL FIELD

The art disclosed herein relates to an electric powered vehicle.

BACKGROUND

Japanese Patent Application Publication No. 2018-062282 describes an electric powered vehicle that travels with a user aboard. In this type of electric powered vehicle, limitation of a maximum speed of the electric powered vehicle may be executed when an obstruction (such as an object or a pedestrian present on a road) is detected. When the electric powered vehicle moves away from the obstruction, the limitation of the maximum speed is released. Limiting the maximum speed while the electric powered vehicle is passing by the obstruction enables optimized traveling.

SUMMARY

In an electric powered vehicle that limits its maximum speed when an obstruction is detected, execution and release of limitation of the maximum speed are repeated when the electric powered vehicle travels in an area with many obstructions. As a result, the electric powered vehicle is repeatedly decelerated and accelerated, resulting in degraded driver comfort of the electric powered vehicle. If, on the other hand, the limitation of the maximum speed is continued over a certain time period after the electric powered vehicle moves away from the obstruction so as to prevent the aforementioned discomfort, this in turn causes another problem that the limitation of the maximum speed is not released for a while even after the electric powered vehicle has passed by an obstruction while traveling in an area with fewer obstructions, and maneuverability is thereby degraded. The disclosure herein proposes an electric powered vehicle configured to travel with driver comfort in both an area with many obstructions and in an area with fewer obstructions.

An electric powered vehicle disclosed herein my comprise: an obstruction detecting device configured to detect an obstruction and detect a distance to the obstruction; a mode switching device configured to switch between a first mode and a second mode; and a maximum speed limiting device, wherein in the first mode, in a case where the distance is shorter than a first reference value, the maximum speed limiting device executes limitation of a maximum speed of the electric powered vehicle to limit the maximum speed to a value that is lower than the maximum speed applied when the distance is longer than the first reference value, in the second mode, in a case where the distance is shorter than a second reference value, the maximum speed limiting device executes limitation of the maximum speed to limit the maximum speed to a value that is lower than the maximum speed applied when the distance is longer than the second reference value, and in a case where the distance changes from a value shorter than both of the first reference value and the second reference value to a value longer than both of the first reference value and the second reference value, the maximum speed limiting device increases the maximum speed at an earlier timing in the second mode than in the first mode.

In this electric powered vehicle, the first mode and the second mode can be switched. The first mode can be selected when the electric powered vehicle is traveling in an area with many obstructions and the second mode can be selected when the electric powered vehicle is traveling in an area with fewer obstructions. This switch between the first mode and the second mode may be executed by an operation by a user or may be executed automatically. When the electric powered vehicle travels to a position close to an obstruction, its maximum speed is limited. When the electric powered vehicle travels from the position close to the obstruction to a position away therefrom, the distance to the obstruction detected by the obstruction detecting device changes from a value shorter than both of the first reference value and the second reference value to a value longer than both of the first reference value and the second reference value, and the limitation of the maximum speed is thereby released. At this occasion, the maximum speed increases at the earlier timing in the second mode than in the first mode. As such, selecting the second mode in the area with fewer obstructions enables acceleration at an earlier timing after the electric powered vehicle has passed by the obstruction, and the electric powered vehicle can thereby travel with high driver comfort. Further, in the case where the distance to the obstruction changes from a value shorter than both of the first reference value and the second reference value to a value longer than both of the first reference value and the second reference value, the maximum speed is increased at a later timing in the first mode than in the second mode. Thus, when another obstruction is detected after the electric powered vehicle has passed by the obstruction, increase in the maximum speed can be suppressed. Consequently, by selecting the first mode in the area with many obstructions, the electric powered vehicle can travel with high driver comfort while unnecessary acceleration is suppressed.

DETAILED DESCRIPTION

Figure 1:
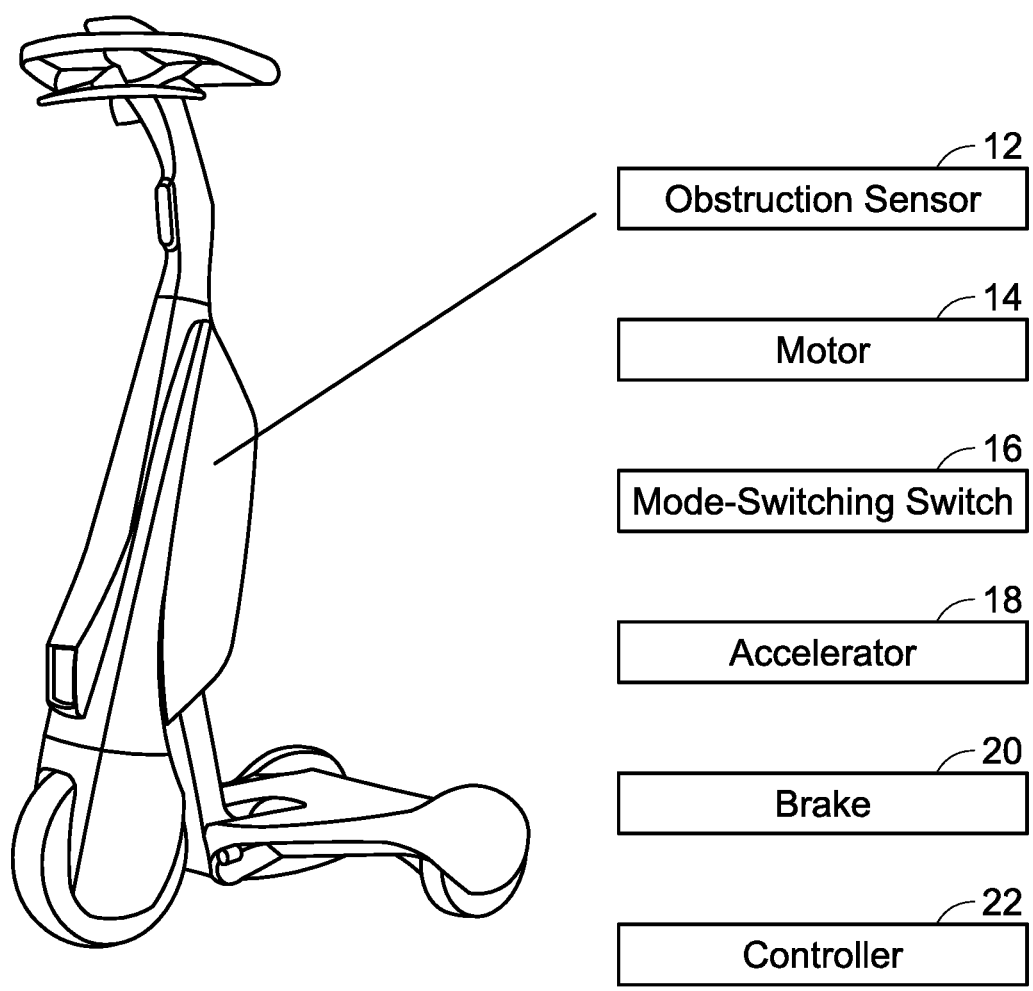
FIG. 1 shows an electric powered vehicle of a first embodiment.

Some of the features characteristic to the electric powered vehicle disclosed herein will be listed. It should be noted that the respective technical elements are independent of one another, and are useful solely or in combinations.

In an example of the electric powered vehicle disclosed herein, in the first mode, the limitation of the maximum speed may be released after a predetermined time has passed from when the distance increased from a value shorter than the first reference value to the first reference value, and in the second mode, the limitation of the maximum speed may be released when the distance has increased from a value shorter than the second reference value to the second reference value.

According to this configuration, when the distance to the obstruction changes from a value shorter than both of the first reference value and the second reference value to a value longer than both of the first reference value and the second reference value, the maximum speed can be increased at an earlier timing in the second mode than in the first mode.

In an example of the electric powered vehicle disclosed herein, in the first mode, in a case where the distance is shorter than the first reference value, the maximum speed may be fixed to a first limited value. In the second mode, in a case where the distance is shorter than the second reference value, the maximum speed may be controlled such that the maximum speed increases from the first limited value as the distance increases.

According to this configuration, in the case where the distance to the obstruction changes from a value shorter than both of the first reference value and the second reference value to a value longer than both of the first reference value and the second reference value, the maximum speed can be increased at an earlier timing in the second mode than in the first mode.

In an example of the electric powered vehicle disclosed herein, the second reference value may be shorter than the first reference value.

According to this configuration, in the case where the distance to the obstruction changes from a value shorter than both of the first reference value and the second reference value to a value longer than both of the first reference value and the second reference value, the maximum speed can be increased at an earlier timing in the second mode than in the first mode.

In an example of the electric powered vehicle disclosed herein, the electric powered vehicle may further comprise a position detecting device configured to detect a position of the electric powered vehicle; and a map storing device configured to store a map in which a first area and a second area are determined, the first mode being configured to be applied in the first area and the second mode being configured to be applied in the second area. The mode switching device may be configured to switch between the first mode and the second mode based on the map and the position detected by the position detecting device.

According to this configuration, switch between the first mode and the second mode can be executed automatically according to the position of the electric powered vehicle.

In an example of the electric powered vehicle disclosed herein, the electric powered vehicle may further comprise a map updating device configured to: in a case where a frequency of execution and release of the limitation is higher than a threshold value, set an area including the position detected by the position detecting device as the first area in the map, and in a case where the frequency of the execution and the release of the limitation is lower than the threshold value, set an area including the position detected by the position detecting device as the second area in the map.

According to this configuration, the area with many obstructions can be set as the first area and the area with fewer obstructions can be set as the second area.

In an example of the electric powered vehicle disclosed herein, the electric powered vehicle may further comprise a current time determining device configured to determine a current time. The first area and the second area may be each determined in the map in association with time. The mode switching device may be configured to switch between the first mode and the second mode based on the map, the position detected by the position detecting device, and the current time determined by the current time determining device.

According to this configuration, the switch between the first mode and the second mode can be executed suitably even when an amount of the obstructions varies with time.

In an example of the electric powered vehicle disclosed herein, the electric powered vehicle may further comprise an accelerator. In a case where an operation frequency of the accelerator is higher than a first predetermined value in the first mode, a parameter for controlling the maximum speed limiting device may be updated such that the maximum speed is increased at an earlier timing when the distance changes from a value shorter than the first reference value to a value longer than the first reference value in the first mode.

According to this configuration, a timing to increase the maximum speed in the first mode can be updated to an earlier timing for a user who feels that the timing to increase the maximum speed in the first mode is too late.

In an example of the electric powered vehicle disclosed herein, the electric powered vehicle may further comprise a brake. In a case where an operation frequency of the brake is higher than a second predetermined value in the first mode, a parameter for controlling the maximum speed limiting device may be updated such that the maximum speed is increased at an later timing when the distance changes from a value shorter than the first reference value to a value longer than the first reference value in the first mode.

According to this configuration, the timing to increase the maximum speed in the first mode can be updated to a later timing for a user who feels that the timing to increase the maximum speed in the first mode is too early.

(First Embodiment) An electric powered vehicle 10 of a first embodiment shown in FIG. 1 is a vehicle driven by an electric power system for a user to ride thereon. Although the electric powered vehicle 10 has three wheels in FIG. 1, the electric powered vehicle may have one or two wheels, or the electric powered vehicle may have four or more wheels. The electric powered vehicle 10 is an electric powered vehicle (so-called walking area EV (electric vehicle)) that moves at a speed that is about the same as a human walking speed (such as a speed of 10 km/hr or slower) in an area where pedestrians walk, such as a sidewalk. As shown in FIG. 1, the electric powered vehicle 10 includes an obstruction sensor 12, a motor 14, a mode-switching switch 16, an accelerator 18, a brake 20, and a controller 22.

The obstruction sensor 12 is a sensor configured to detect an obstruction in a surrounding of the electric powered vehicle 10. The obstruction includes an object on a road (vehicle, gutter, fence, tree, etc.) and pedestrians. The obstruction sensor 12 is an optical or ultrasonic object sensor. The obstruction sensor 12 is configured to detect an obstruction in a surrounding of the electric powered vehicle 10 while the electric powered vehicle 10 is traveling. When the obstruction sensor 12 detects an obstruction, it is configured to detect a distance Ls to this obstruction (that is, a distance between the electric powered vehicle 10 and this obstruction). The obstruction sensor 12 is configured to detect the obstruction and the distance Ls at a predetermined cycle while the electric powered vehicle 10 is traveling.

The motor 14 is configured to drive by receiving electric power from a battery mounted on the electric powered vehicle 10. The electric powered vehicle 10 travels by the motor 14 driving. The motor 14 is controlled by the controller 22.

The mode-switching switch 16 is a switch configured to be operated by a user. The mode-switching switch 16 is configured to switch between a first mode and a second mode. A process executed by the controller 22 varies between the first mode and the second mode.

The accelerator 18 is configured to instruct the controller 22 to accelerate according to an operation thereon by the user.

The brake 20 is configured to decelerate the electric powered vehicle 10 according to an operation thereon by the user.

The controller 22 is connected to the obstruction sensor 12, the motor 14, the mode-switching switch 16, the accelerator 18, and the brake 20. The controller 22 is configured to control the motor 14 based on signals inputted from the obstruction sensor 12, the mode-switching switch 16, the accelerator 18, and the brake 20. The controller 22 is configured to control a speed V (moving speed) of the electric powered vehicle 10 by driving the motor 14 according to the signal inputted from the accelerator 18. Further, the controller 22 is configured to set a maximum speed Vmax of the electric powered vehicle 10 according to the signals inputted from the obstruction sensor 12 and from the mode-switching switch 16. The controller 22 controls the speed V of the electric powered vehicle 10 within a range of up to maximum speed Vmax.

The controller 22 is configured to change the maximum speed Vmax according to the distance Ls to the obstruction. The controller 22 stores graphs G1, G2 shown in FIG. 2. The graphs G1, G2 define a relationship between the distance Ls to the obstruction and the maximum speed Vmax. The controller 22 sets the maximum speed Vmax according to the graphs G1, G2. When the first mode is selected by the mode-switching switch 16, the controller 22 sets the maximum speed Vmax according to the graph G1, and when the second mode is selected by the mode-switching switch 16, the controller 22 sets the maximum speed Vmax according to the graph G2.

In the first mode (graph G1), in a case where the distance Ls is shorter than a first reference value Ls1, the controller 22 limits the maximum speed Vmax to a lower value than in a case where the distance Ls is longer than or equal to the first reference value Ls1. More specifically, in the first mode, the maximum speed Vmax applied when the distance Ls is longer than or equal to the first reference value Ls1 is a value VmaxH, and the maximum speed Vmax applied when the distance Ls is shorter than the first reference value Ls1 is a value VmaxL. The value VmaxL is smaller than the value VmaxH. That is, the controller 22 limits the maximum speed Vmax to the value VmaxL when the distance Ls is shorter than the first reference value Ls1. In the first mode, the maximum speed Vmax applied when the distance Ls is shorter than the first reference value Ls1 is fixed to the value VmaxL.

Figure 2:
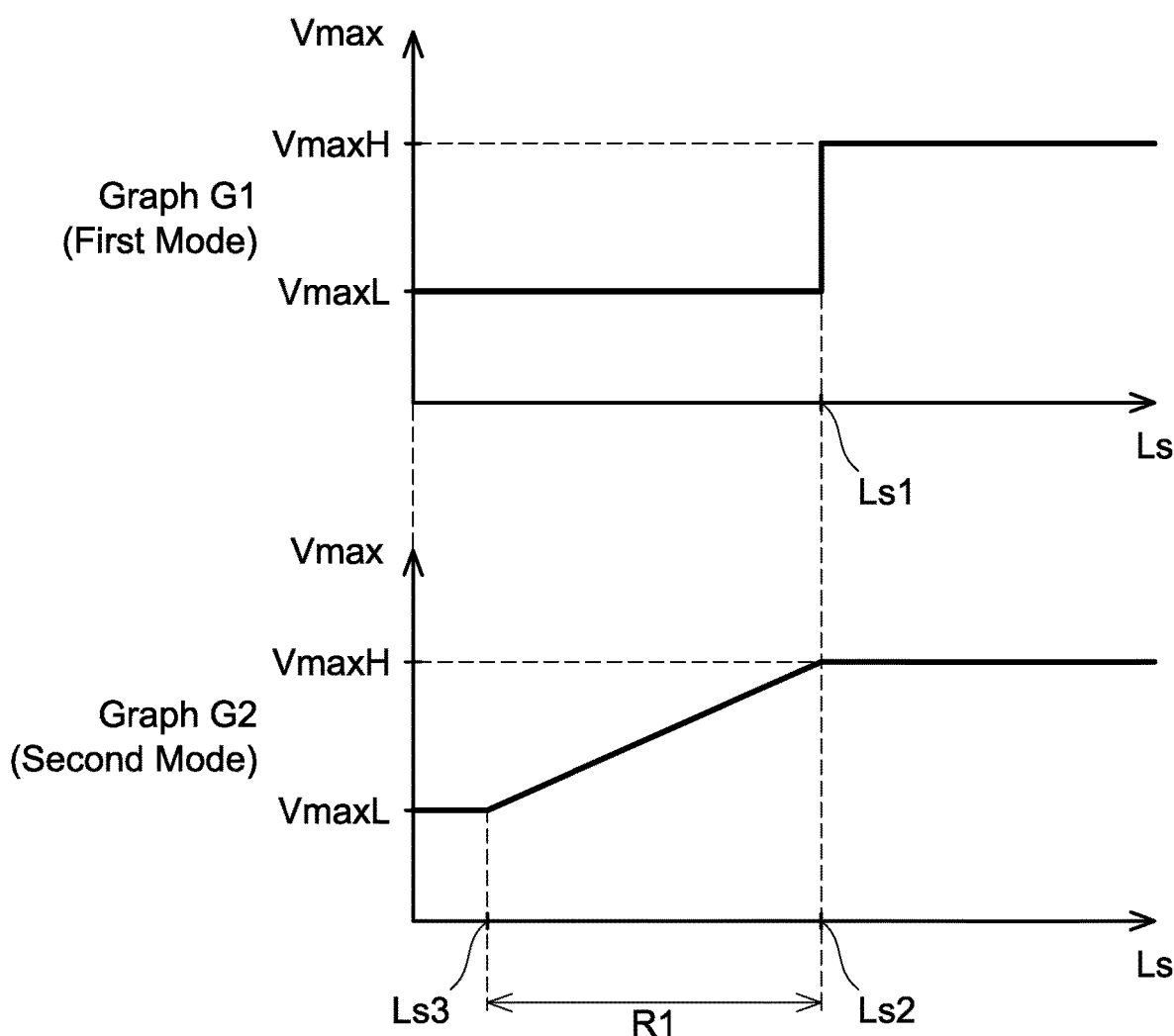
FIG. 2 is a graph indicating a maximum speed Vmax in a first mode and in a second mode.

In the second mode (graph G2), in a case where the distance Ls is shorter than a second reference value Ls2, the controller 22 limits the maximum speed Vmax to a value lower than a value applied when the distance Ls is longer than or equal to the second reference value Ls2. More specifically, in the second mode, the maximum speed Vmax applied when the distance Ls is longer than or equal to the second reference value Ls2 is a value VmaxH (which is a value equal to the value VmaxH in the first mode). In FIG. 2, the second reference value Ls2 is equal to the first reference value Ls1. In the second mode, the maximum speed Vmax applied when the distance Ls is shorter than the second reference value Ls2 changes according to the distance Ls. In a case where the distance Ls is shorter than a third reference value Ls3, the maximum speed Vmax is fixed to a value VmaxL (which is a value equal to the value VmaxL in the first mode). The longer the distance Ls is, the higher that maximum speed Vmax becomes when the distance Ls is in a range R1 longer than or equal to the third reference value Ls3 and shorter than the second reference value Ls2. In the range R1, the maximum speed Vmax increases linearly from the value VmaxL to the value VmaxH according to an increase in the distance Ls.

Next, a process which the controller 22 executes while the electric powered vehicle 10 is traveling will be described. In the first embodiment, switch between the first mode and the second mode is executed by the user operating the mode-switching switch 16. The user selects the first mode by using the mode-switching switch 16 when traveling in an area with many obstruction (such as in an area with a narrow road width or with many pedestrians), and selects the second mode by using the mode-switching switch 16 when traveling in an area with fewer obstructions. The controller 22 is configured to repeatedly execute the process shown in FIG. 3 while the electric powered vehicle 10 is traveling.

In step S2, the controller 22 receives a signal from the mode-switching switch 16 (signal indicating which one of the first mode and the second mode is selected).

Next, in step S4, the controller 22 receives from the obstruction sensor 12 the distance Ls to the obstruction. In the case where the obstruction sensor 12 has detected a plurality of obstructions, the controller 22 acquires a distance to a closest obstruction as the distance Ls. In the case where the obstruction sensor 12 detects no obstruction, a maximum value possible as the distance Ls is acquired by the controller 22.

Next, in step S6, the controller 22 determines whether the mode currently selected is the first mode or the second mode based on the signal received in step S2. The controller 22 executes steps S8 to S14 when the first mode is selected. The controller 22 executes step S16 when the second mode is selected.

When the first mode is selected, the controller 22 executes step S8. In step S8, the controller 22 determines a value to be set as the next maximum speed Vmax (hereinbelow termed "instructed value") based on the graph G1 shown in FIG. 2 and the distance Ls acquired in step S4. As indicated in the graph G1, the controller 22 determines the value VmaxL as the instructed value of the maximum speed Vmax when the distance Ls is shorter than the first reference value Ls1. The controller 22 determines the value VmaxH as the instructed value of the maximum speed Vmax when the distance Ls is longer than or equal to the first reference value Ls1.

Next, in step S10, the controller 22 executes determination on the distance Ls. In step S10, the controller 22 determines whether the distance Ls has increased from a value shorter than the first reference value Ls1 to a value longer than or equal to the first reference value Ls1 by using the distance Ls acquired in step S4 executed most recently and the distance Ls acquired in step S4 executed before the most recent execution of step S4. In the case of YES in step S10, the controller 22 stands by for a time T in step S12, and thereafter executes step S14. In the case of NO in step S10, the controller 22 executes step S14 without standing by.

In step S14, the controller 22 updates the maximum speed Vmax to the instructed value determined in step S8. Consequently, from this step S14, the speed V of the electric powered vehicle 10 is controlled within a range of up to the maximum speed Vmax as updated in step S14.

When the second mode is selected, the controller 22 executes step S16. In step S16, the controller 22 determines the instructed value of the maximum speed Vmax based on the graph G2 shown in FIG. 2 and the distance Ls acquired in step S4. That is, the controller 22 determines the value VmaxL as the instructed value of the maximum speed Vmax in the case where the distance Ls is shorter than the third reference value Ls3. In a case where the distance Ls is within a range R1, the controller 22 determines a value in the range R1 corresponding to the distance Ls (a value higher than the value VmaxL and less than or equal to the value VmaxH) as the instructed value of the maximum speed Vmax. In a case where the distance Ls is longer than or equal to the second reference value Ls2, the controller 22 determines the value VmaxH as the instructed value of the maximum speed Vmax. In step S16, when the instructed value of the maximum speed Vmax is determined, the controller 22 updates the maximum speed Vmax to the instructed value as determined. Consequently, from this step S16, the speed V of the electric powered vehicle 10 is controlled within the range of up to the maximum speed Vmax as updated in step S16.

Next, an operation executed upon when the electric powered vehicle 10 moves away from the obstruction will be described for both cases of the first mode and the second mode.

The case of the first mode will be described first. As aforementioned, the controller 22 repeatedly executes the process of FIG. 3 while the electric powered vehicle 10 is traveling. In the first mode, steps S2, S4, S6, S8, S10, and S14 are executed. Further, in the first mode, step S12 is selectively executed. When the electric powered vehicle 10 is traveling close to the obstruction, the distance Ls acquired in step S4 becomes shorter than the first reference value Ls1. In this case, in the first mode, the value VmaxL is determined as the instructed value of the maximum speed Vmax in step S8. While the electric powered vehicle 10 is traveling close to the obstruction, the determination of NO is made in step S10 and the value VmaxL is set as the maximum speed Vmax in step S14.

After this, the distance Ls to the obstruction gradually increases as the electric powered vehicle 10 keeps traveling. Steps S2, S4, S6, S8, S10, and S14 are repeatedly executed while the distance Ls is shorter than the first reference value Ls1, and the maximum speed Vmax is thereby maintained at the value VmaxL.

After this, when the distance Ls to the obstruction increases to the first reference value Ls1 as the electric powered vehicle 10 keeps traveling, the value VmaxH is determined as the instructed value of the maximum speed Vmax in step S8. Further, in this case, since the distance Ls in previous processing was shorter than the first reference value Ls1 and the distance Ls in present processing is longer than or equal to the first reference value Ls1, determination of YES is made in step S10. As such, the controller 22 executes step S14 after the standby over the time T in step S12. In step S14, the maximum speed Vmax is updated to the value VmaxH as determined in step S8. That is, the maximum speed Vmax is increased from the value VmaxL to the value VmaxH.

After this, the distance Ls to the obstruction further increases as the electric powered vehicle 10 keeps traveling. While the distance Ls is longer than the first reference value Ls1, steps S2, S4, S6, S8, S10, and S14 are repeatedly executed and the maximum speed Vmax is maintained at the value VmaxH.

As above, in the first mode, the maximum speed Vmax is fixed to the lower value VmaxL while the distance Ls is shorter than the first reference value Ls1. Further, in the first mode, when the distance Ls increases from a value shorter than the first reference value Ls1 to a value longer than or equal to the first reference value Ls1, the controller 22 increases the maximum speed Vmax from the value VmaxL to the value VmaxH after the standby over the time T. As such, in the first mode, the maximum speed Vmax is fixed to the low value VmaxL while the distance Ls is shorter than the first reference value Ls1, and when the distance Ls reaches the first reference value Ls1, the maximum speed Vmax is increased to the value VmaxH after the standby over the time T. Consequently, in the first mode, a timing to increase the maximum speed Vmax arrives late for the case in which the distance Ls changes from a value shorter than the first reference value Ls1 to a value longer than the first reference value Ls1.

Next, the second mode will be described. In the second mode, steps S2, S4, S6, and S16 are executed. When the electric powered vehicle 10 is traveling very close to the obstruction, the distance Ls acquired in step S4 becomes shorter than the third reference value Ls3. In this case, in the second mode, the maximum speed Vmax is set to the value VmaxL in step S16. While the distance Ls is shorter than the third reference value Ls3, the maximum speed Vmax is maintained at the value VmaxL.

After this, when the distance Ls reaches the third reference value Ls3 as the electric powered vehicle 10 keeps traveling, the maximum speed Vmax is set to a value according to the distance Ls (a value in the range R1 in the graph G2 of FIG. 2) in step S16. In a case where the distance Ls is gradually increasing within the range R1 due to the electric powered vehicle 10 traveling, the maximum speed Vmax gradually increases as the distance Ls increases.

After this, when the distance Ls reaches the second reference value Ls2 as the electric powered vehicle 10 keeps traveling, the maximum speed Vmax is set to the value VmaxH in step S16. While the distance Ls is longer than or equal to the second reference value Ls2, the maximum speed Vmax is maintained at the value VmaxH.

As above, in the second mode, the maximum speed Vmax increases as the distance Ls increases when the distance Ls is in the range R1 shorter than the second reference value Ls2. Further, in the second mode, the maximum speed Vmax is increased without the standby time. As such, a timing to increase the maximum speed Vmax when the distance Ls changes from a value shorter than both the first reference value Ls1 and the second reference value Ls2 to a value longer than these reference values arrives earlier in the second mode than in the first mode.

As explained above, when the distance Ls increases, the maximum speed Vmax increases at an earlier timing in the second mode than in the first mode. As such, by selecting the second mode when traveling in an area with fewer obstructions, the electric powered vehicle 10 can accelerate at an earlier timing after having passed by the obstruction. This enables driving with high comfort. Further, selecting the first mode upon traveling in an area with many obstructions can prevent execution of acceleration just after the electric powered vehicle 10 has passed by the obstruction. This can prevent a repeat of acceleration and deceleration caused by encountering another obstruction after the electric powered vehicle 10 has passed by one obstruction. This enables driving with high comfort. As above, according to the electric powered vehicle 10 of the first embodiment, driving with high comfort is enabled in both areas with many obstructions and with fewer obstructions.

In the aforementioned first embodiment, the maximum speed Vmax is configured to increase at an earlier timing in the second mode than in the first mode by setting different increasing rates of the maximum speed Vmax (an increasing rate of the maximum speed Vmax upon when the distance Ls increases) applied when the distance Ls is shorter than both the first reference value Ls1 and the second reference value Ls2. Further, the maximum speed Vmax is configured to increase at an earlier timing in the second mode than in the first mode also by increasing the maximum speed Vmax in the first mode after standing by over the time T while the maximum speed Vmax is increased in the second mode without the standby time. However, only one of these configurations may be employed. For example, when the graphs G1, G2 are set as shown in FIG. 2, the maximum speed Vmax may be updated without the standby time in both the first mode and the second mode (that is, step S12 of FIG. 3 may be omitted). Further, for example, the graphs G1, G2 may be set to be identical with each other as in FIG. 4, and when the maximum speed Vmax is increased from the value VmaxL to the value VmaxH, the timing to increase the maximum speed Vmax may be made to arrive earlier in the second mode than in the first mode by applying the standby time in the first mode but not in the second mode.

Figure 5:
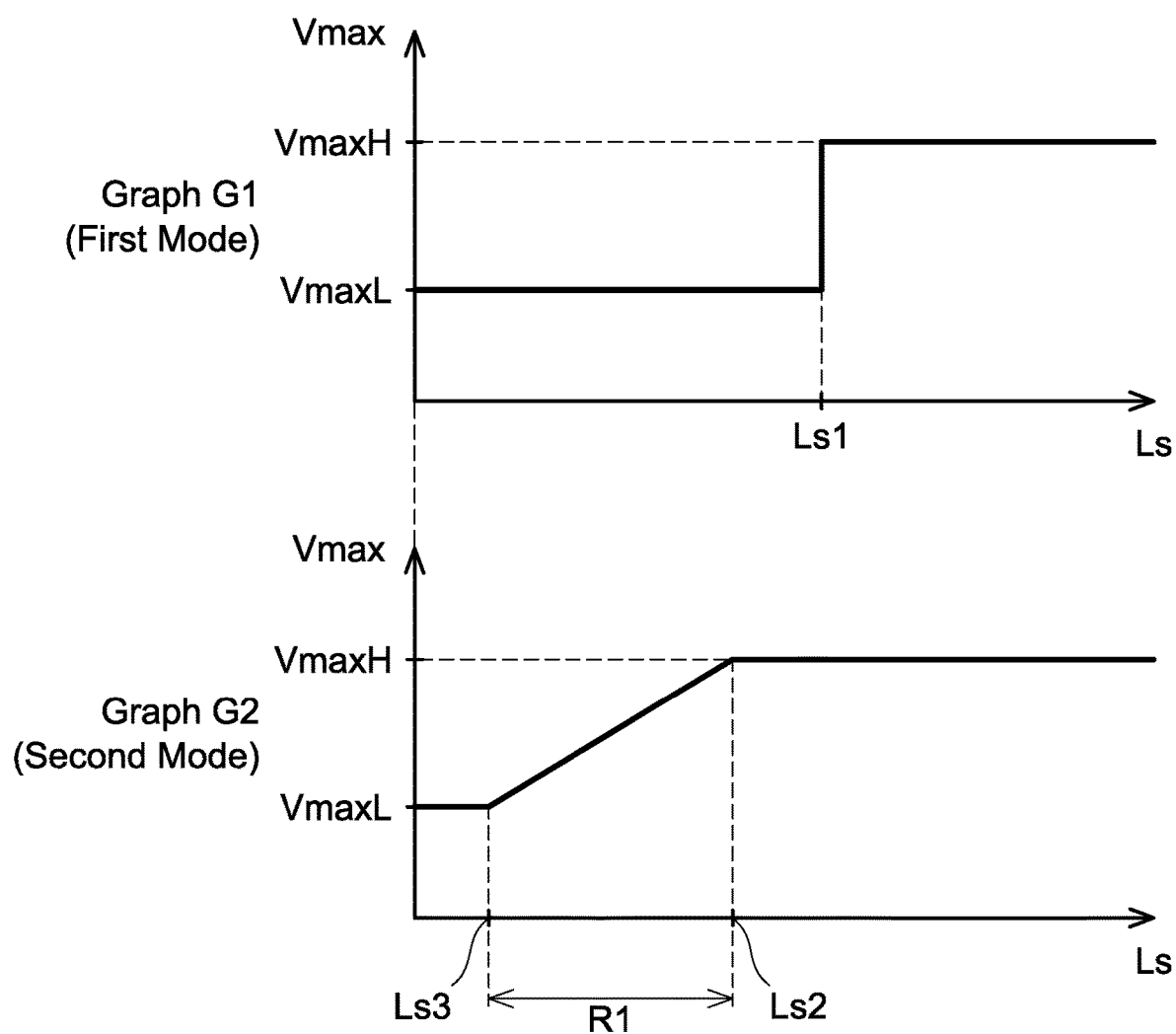
FIG. 5 is a graph indicating a maximum speed Vmax of a second variant.
Figure 6:
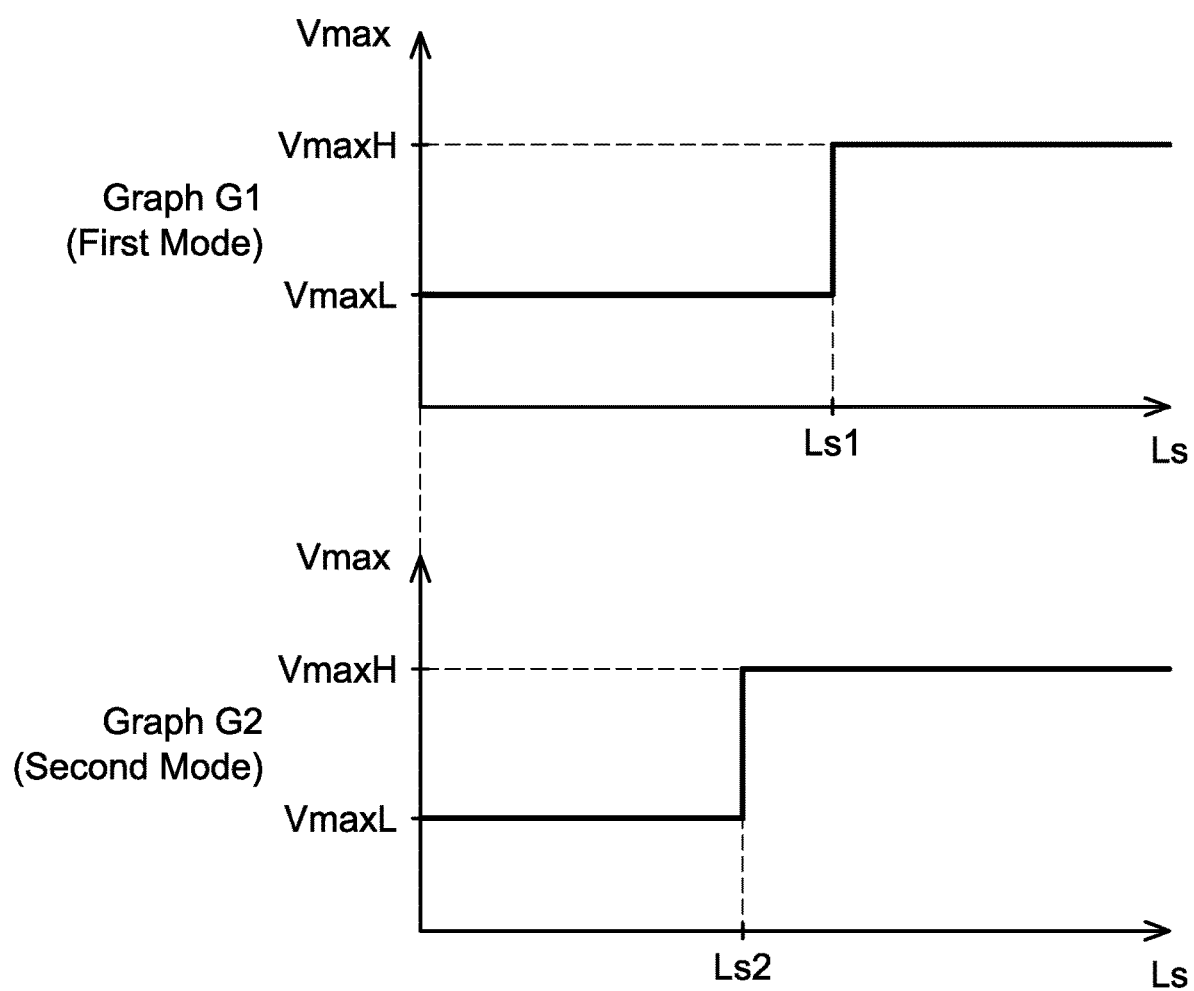
FIG. 6 is a graph indicating a maximum speed Vmax of a third variant.

Further, in the aforementioned first embodiment, the first reference value Ls1 and the second reference value Ls2 are equal, however, the second reference value Ls2 may be shorter than the first reference value Ls1 as shown in FIG. 5. According to this configuration as well, the maximum speed Vmax can be increased at an earlier timing in the second mode than in the first mode. Further, as shown in FIG. 6, the second reference value Ls2 may be set shorter than the first reference value Ls1 and the graph G2 may be configured such that the maximum speed Vmax exhibits a step change as the graph G1. According to this configuration as well, the maximum speed Vmax can be increased at an earlier timing in the second mode than in the first mode. As for the first mode in FIGS. 5 and 6, the standby time may or may not be applied.

Second Embodiment

Figure 7:
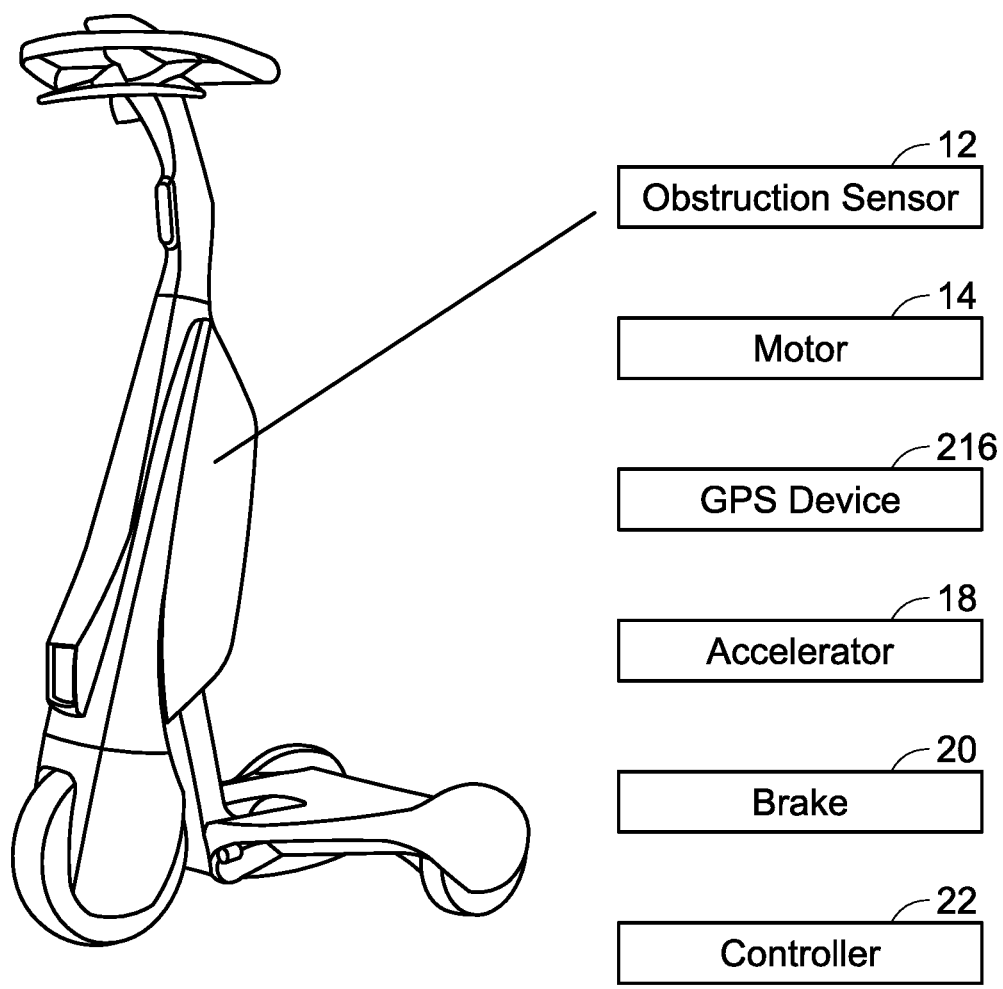
FIG. 7 shows an electric powered vehicle of a second embodiment.

An electric powered vehicle 200 of a second embodiment shown in FIG. 7 includes a Global Pointing System (GPS) device 216 instead of the mode-switching switch 16. Further, in the electric powered vehicle 200 of the second embodiment, the controller 22 stores an obstruction map. The other configurations of the electric powered vehicle 200 of the second embodiment are the same as those of the electric powered vehicle 10 of the first embodiment. The GPS device 216 is configured to receive a GPS signal from the outside and determine a current position of the electric powered vehicle 200.

Figure 8:
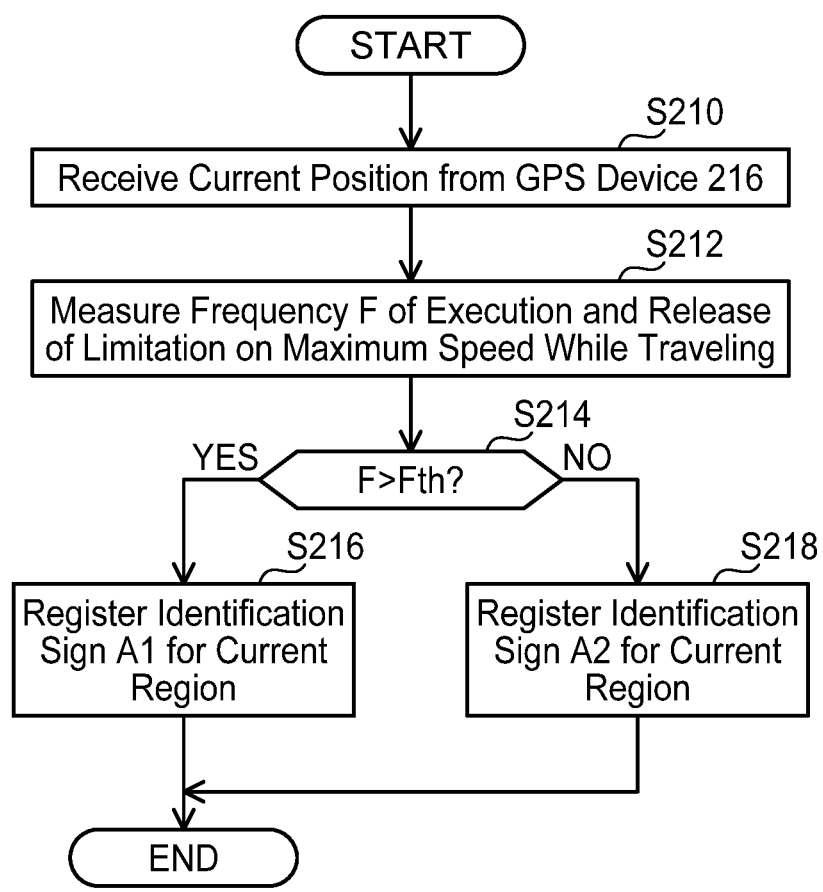
FIG. 8 is a flowchart showing a process of registering an obstruction density to an obstruction map in the second embodiment.

In the second embodiment, the controller 22 is configured to register information on obstructions for each area in the obstruction map while the electric powered vehicle 200 is traveling. In an area where information on obstructions is not registered, the controller 22 is configured to control the maximum speed Vmax according to the second mode (that is, the graph G2 of FIG. 2). FIG. 8 shows a process in which the controller 22 registers information on obstructions to the obstruction map. The controller 22 is configured to repeatedly execute the process shown in FIG. 8 while the electric powered vehicle 200 is traveling.

In step S210, the controller 22 receives the current position of the electric powered vehicle 200 (hereinbelow termed "current position") from the GPS device 216. Then, in step S212, the controller 22 monitors traveling state of the electric powered vehicle 200. In step S212, when the electric powered vehicle 200 approaches an obstruction, the distance Ls becomes shorter than the reference values Ls1, Ls2, and limitation on the maximum speed Vmax is executed. Further, in step S212, when the electric powered vehicle 200 moves away from the obstruction, the distance Ls becomes longer than or equal to the reference values Ls1, Ls2 and the limitation on the maximum speed Vmax is released. In step S212, the controller 22 measures a frequency F at which the limitation on the maximum speed Vmax is executed and released. In step S214, the controller 22 determines whether the frequency F is higher than a threshold value Fth. In determining YES in step S214, the controller 22 identifies an area including the current position (the current position determined in step S210) from the obstruction map and registers an identification sign A1 to this area (an identification sign indicating that there are many obstructions and the first mode should be applied) in step S216. In determining NO in step S214, the controller 22 identifies the area including the current position from the obstruction map and registers an identification sign A2 to this area (an identification sign indicating that there are few obstructions and the second mode should be applied) in step S218. Due to the controller 22 repeatedly executing the process of FIG. 8 while the electric powered vehicle 200 is traveling, either of the identification signs A1, A2 is registered for each area in the obstruction map.

As above, in the second embodiment, the controller 22 determines the number (density) of the obstructions based on the frequency F of execution and release of the limitation on the maximum speed Vmax and registers either of the identification signs A1, A2 for each area. Consequently, either of the identification signs A1, A2 can easily and suitably be registered for each area. As such, the obstruction map indicating which one of the first mode and the second mode should be applied can suitably be created.

Figure 9:
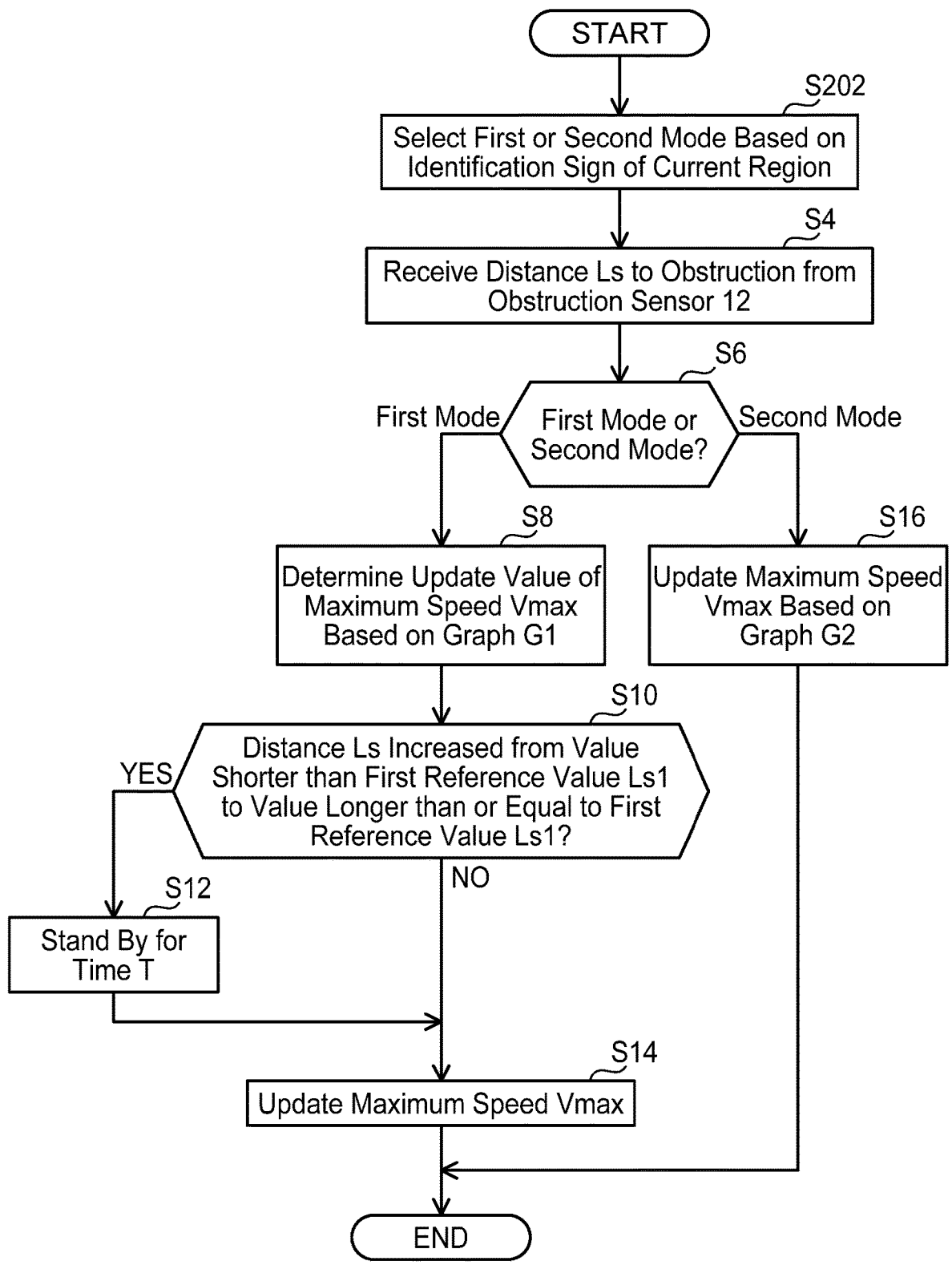
FIG. 9 is a flowchart showing a process of controlling a maximum speed Vmax in the second embodiment.

FIG. 9 shows a process in which the controller 22 controls the maximum speed Vmax in the second embodiment. The process of FIG. 9 is the same as the process of FIG. 3 except that step S202 is different from step S2.

In step S202, the controller 22 receives the current position of the electric powered vehicle 200 from the GPS device 216. Then, the controller 22 identifies an area including the received current position (hereinbelow termed "current area") from the obstruction map, and determines the identification sign which this current area is given. The controller 22 selects the first mode in the case where the current area has the identification sign A1, while selects the second mode in the case where the current area has the identification sign A2. After this, the controller 22 executes the processes from step S4 in the same manner as the first embodiment.

As above, in the second embodiment, the controller 22 automatically selects the first mode and the second mode based on the current position received from the GPS device 216 and the obstruction map. Due to this, the user does not have to manually switch between the first mode and the second mode.

Third Embodiment

Figure 10:
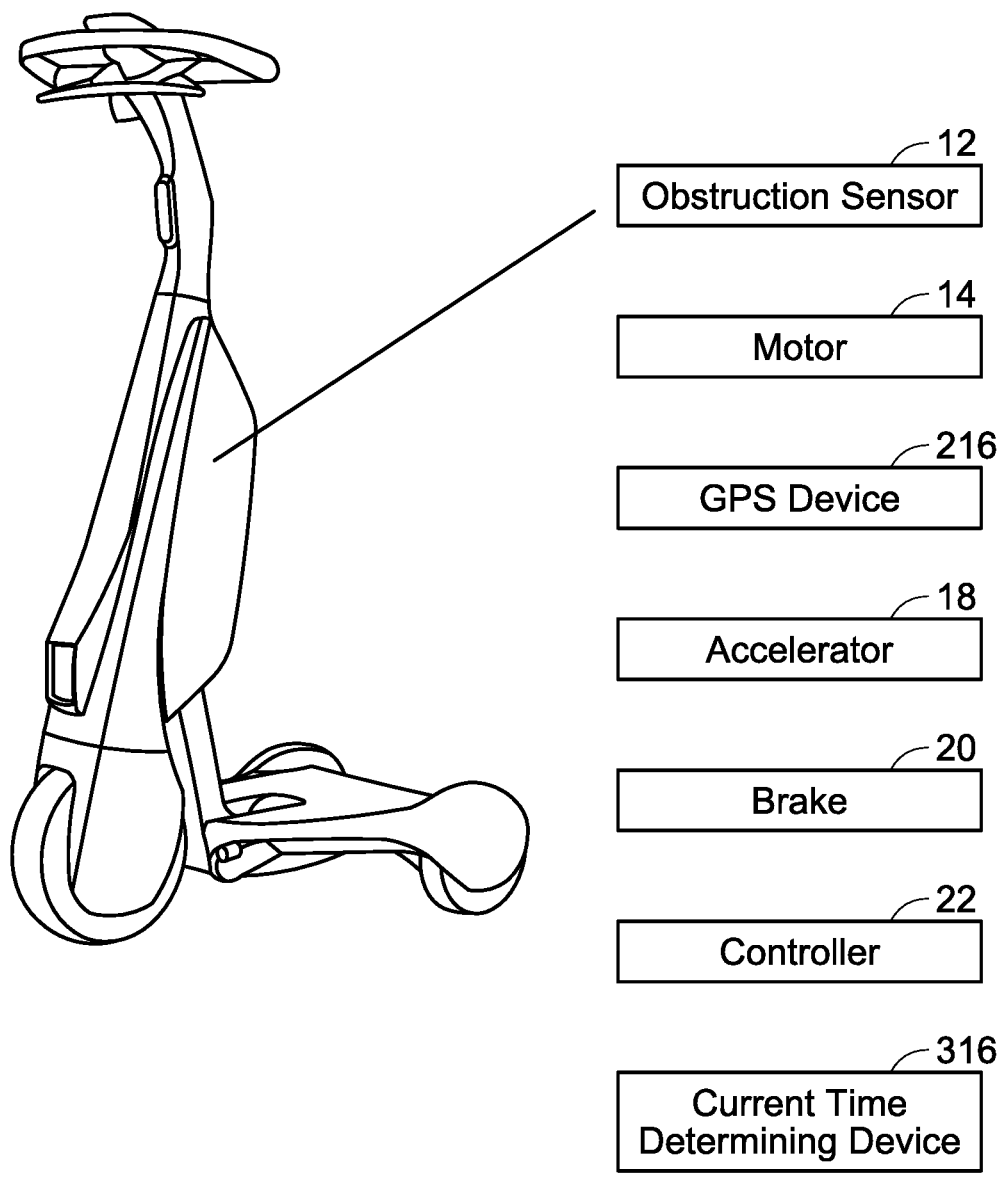
FIG. 10 shows an electric powered vehicle of a third embodiment.

An electric powered vehicle 300 of a third embodiment shown in FIG. 10 has a configuration that further adds a current time determining device 316 to the electric powered vehicle 200 of the second embodiment. The current time determining device 316 is configured to determine a current time.

Figure 11:
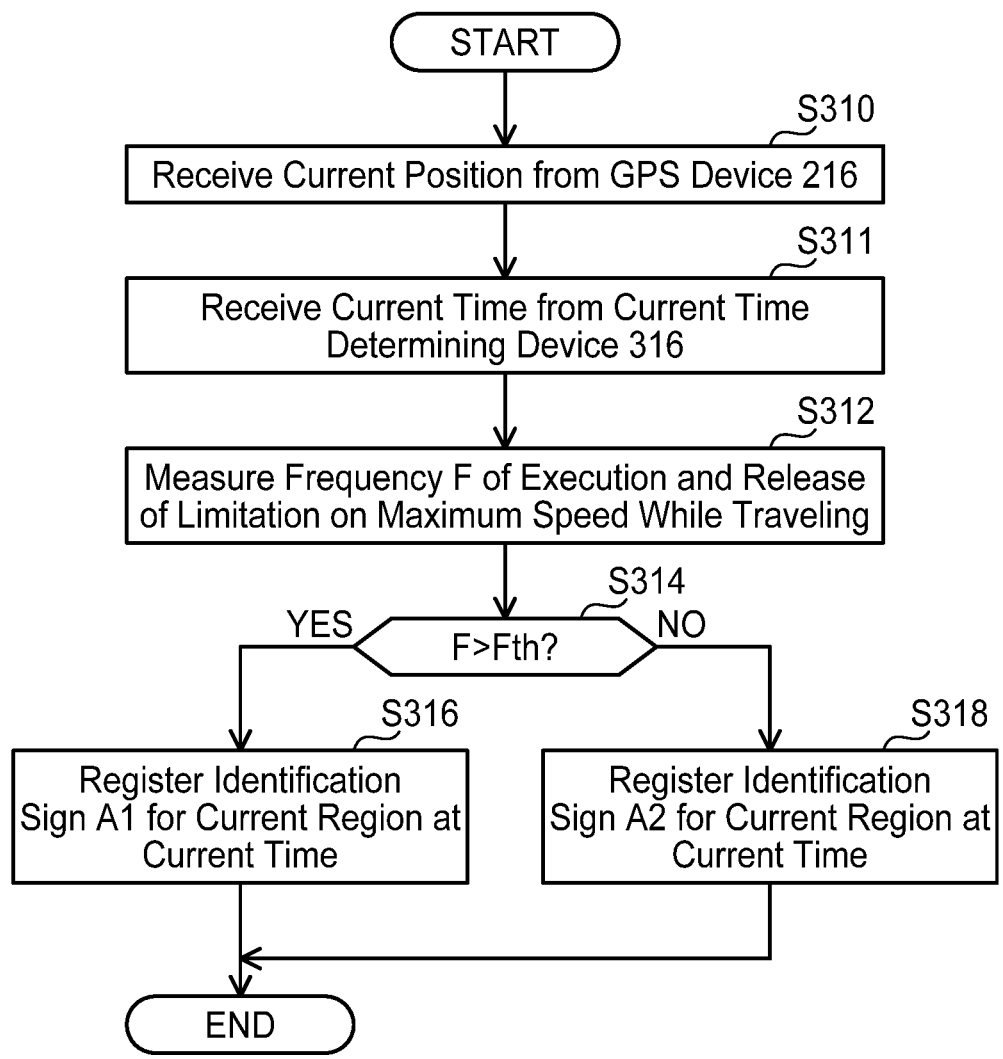
FIG. 11 is a flowchart showing a process of registering an obstruction density to an obstruction map in the third embodiment.

In the third embodiment, the controller 22 registers information on obstructions to the obstruction map for each area in association with time while the electric powered vehicle 300 is traveling. The controller 22 repeatedly executes a process shown in FIG. 11 while the electric powered vehicle 300 is traveling.

In step S310, the controller 22 receives the current position of the electric powered vehicle 300 from the GPS device 216. In step S310, the controller 22 receives a current time from the current time determining device 316. In step S312, the controller 22 monitors traveling state of the electric powered vehicle 300 in the same manner as step S212 of the second embodiment. That is, in step S312, the controller 22 measures the frequency F at which the limitation on the maximum speed Vmax is executed and released. In step S314, the controller 22 determines whether the frequency F is higher than the threshold value Fth. In determining YES in step S314, the controller 22 identifies in step S316 a current area from the obstruction map. Further, the controller 22 registers the identification sign A1 as the identification sign to the current area at the current time (the current time received in step S311). Further, in determining NO in step S314, the controller 22 registers the identification sign A2 as the identification sign to the current area at the current time in step S318. Either of the identification signs A1, A2 is registered for each area in the obstruction map in association with time by the controller 22 repeatedly executing the process of FIG. 11 while the electric powered vehicle 300 is traveling.

As above, in the third embodiment, the controller 22 registers either of the identification signs A1, A2 for each area in accordance with time.

Figure 12:
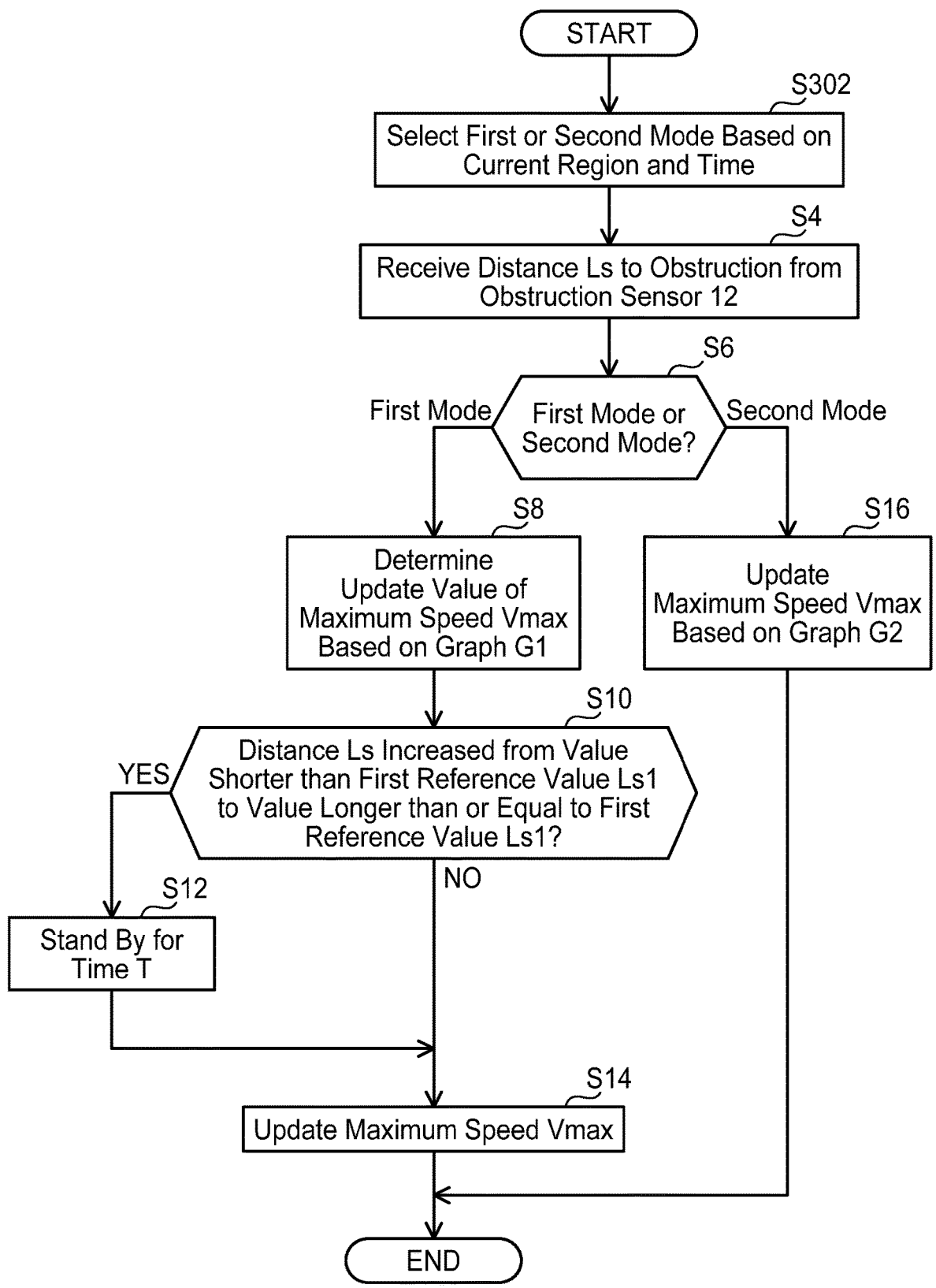
FIG. 12 is a flowchart showing a process of controlling a maximum speed Vmax in the third embodiment.

FIG. 12 shows a process in which the controller 22 controls the maximum speed Vmax in the third embodiment. The process of FIG. 12 is the same as the process of FIG. 9 except that step S302 is different from step S202.

In step S302, the controller 22 receives the current position of the electric powered vehicle 300 from the GPS device 216 and receives the current time from the current time determining device 316. Then, the controller 22 determines the identification sign corresponding to the current area (the area including the current position received from the GPS device 216) and the current time from the obstruction map. The controller 22 selects the first mode in the case where the identification sign as determined is the identification sign A1, while selects the second mode in the case where the identification sign as determined is the identification sign A2. After this, the controller 22 executes the processes from step S4 in the same manner as the first and second embodiments.

As above, in the third embodiment, the controller 22 automatically selects the first mode and the second mode based on the current position received from the GPS device 216, the current time received from the current time determining device 316, and the obstruction map. The number of the obstructions (such as the number of pedestrians) varies with time. According to the electric powered vehicle 300 of the third embodiment, the first mode and the second mode can suitably and automatically be selected even when the number of the obstructions varies with time.

Fourth Embodiment

Figure 3:
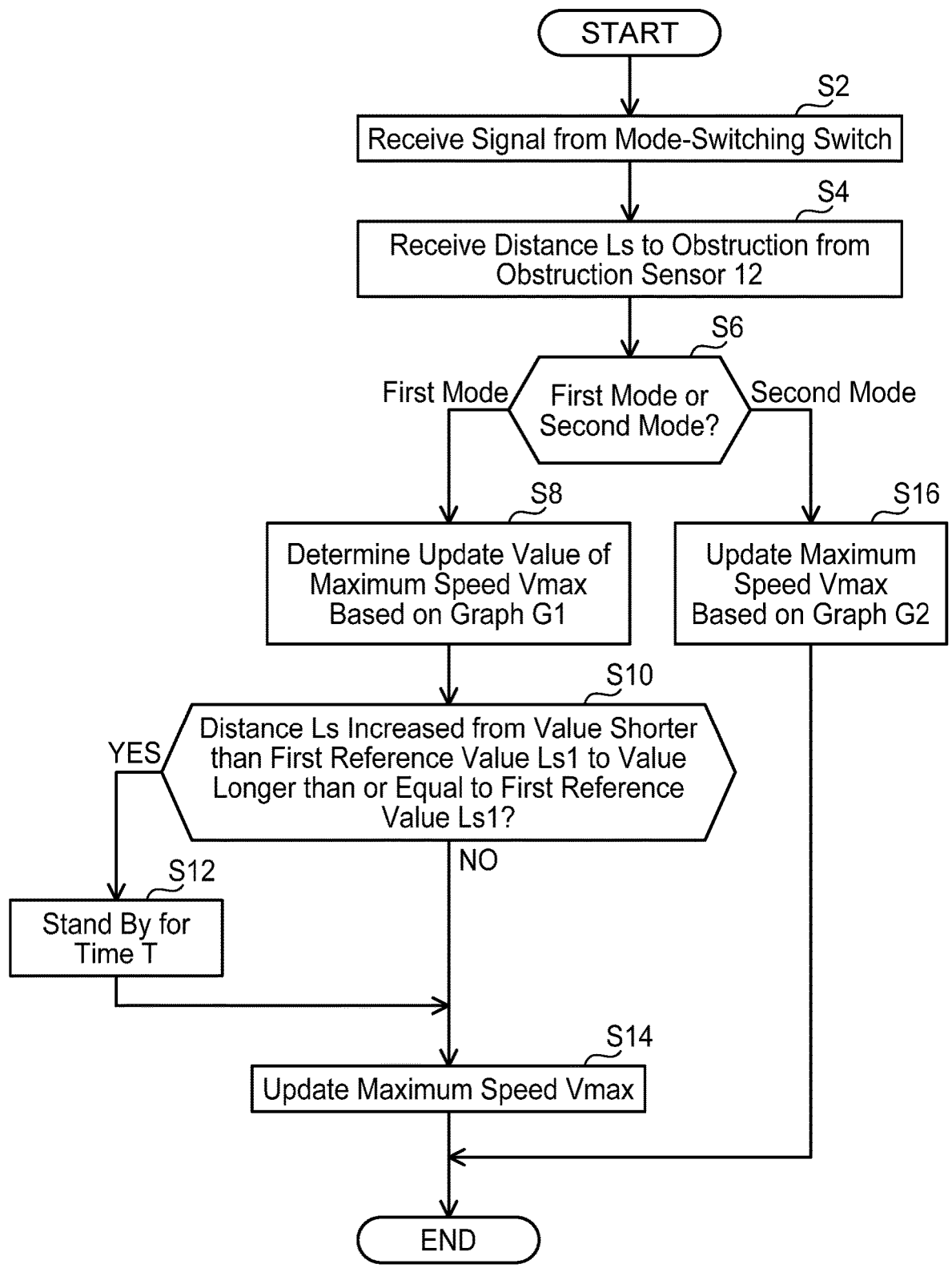
FIG. 3 is a flowchart showing a process of controlling the maximum speed Vmax in the first embodiment.
Figure 4:
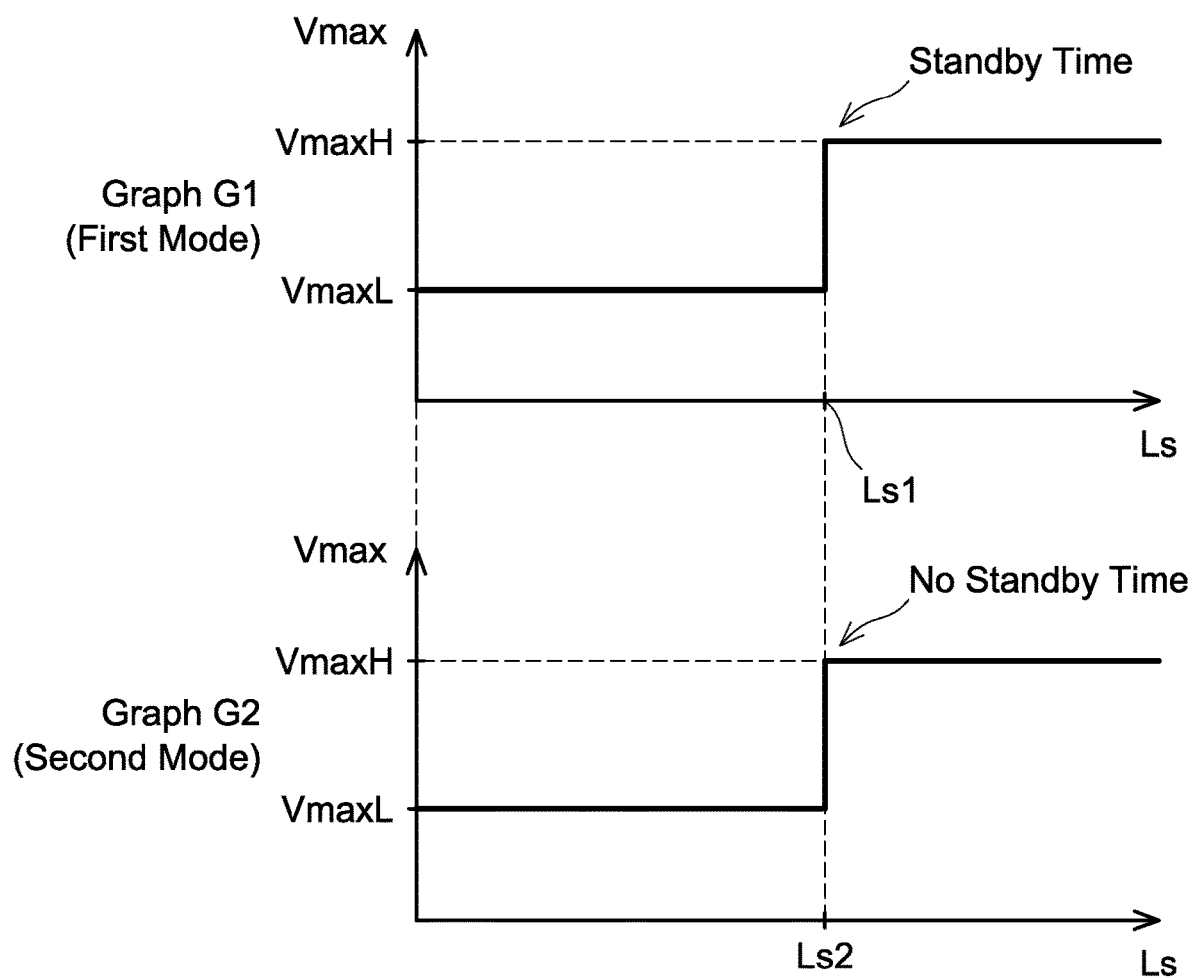
FIG. 4 is a graph indicating a maximum speed Vmax of a first variant.
Figure 13:
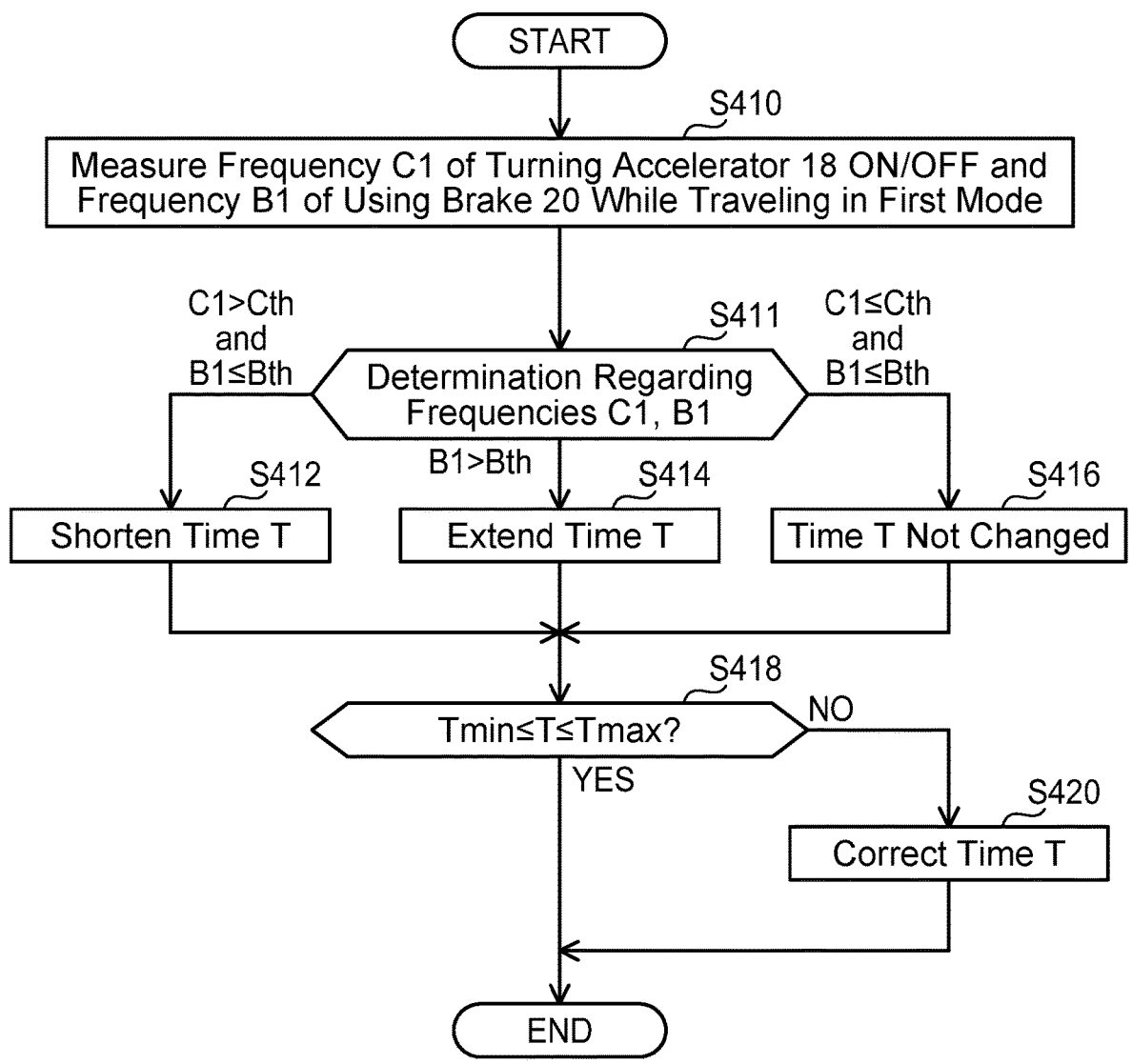
FIG. 13 is a flowchart showing a process of adjusting a standby time T in a fourth embodiment.

In a fourth embodiment, an electric powered vehicle controls the maximum speed Vmax according to one of the processes of the first to third embodiments (that is, one of FIGS. 3, 9, and 12). Further, in the fourth embodiment, the controller 22 is configured to measure operation frequencies of the accelerator 18 and the brake 20 while the electric powered vehicle is traveling in the first mode. Then, the controller 22 is configured to adjust parameters in the first mode according to the measured operation frequencies. The controller 22 repeatedly executes the process of FIG. 13 while the electric powered vehicle is traveling in the first mode.

In step S410, the controller 22 monitors traveling state of the electric powered vehicle in the first mode. That is, the controller 22 measures a frequency C1 at which the user turns the accelerator 18 on and off and a frequency B1 at which the user uses the brake 20 while the electric powered vehicle is traveling. Then, in step S411, the controller 22 determines whether the frequency C1 is higher than a threshold value Cth and whether the frequency B1 is higher than a threshold value Bth. The frequency C1 at which the user turns the accelerator 18 on and off being higher than the threshold value Cth means that when the limitation on the maximum speed Vmax is released, the user is feeling that the timing to increase the maximum speed Vmax is too slow. Further, the frequency B1 at which the user uses the brake 20 being higher than the threshold value Bth means that when the limitation on the maximum speed Vmax is released, the user is feeling that the timing to increase the maximum speed Vmax is too early.

In the case where the frequency C1 is higher than the threshold value Cth and the frequency B1 is less than or equal to the threshold value Bth, this means that the user is feeling that the timing to increase the maximum speed Vmax is too slow. As such, in this case, the controller 22 shortens the time T (the standby time in step S12 of FIGS. 3, 9, and 12) to 0.9 times the current time T in step S412.

In the case where the frequency B1 is higher than the threshold value Bth, this means that the user is feeling that the timing to increase the maximum speed Vmax is too early. As such, in this case, the controller 22 extends the time T to 1.1 times the current time T in step S414.

In the case where the frequency C1 is less than or equal to the threshold value Cth and the frequency B1 is less than or equal to the threshold value Bth, this means that the user is feeling that the timing to increase the maximum speed Vmax is adequate. As such, in this case, the controller 22 maintains the time T to the current value in step S416.

The controller 22 executes step S418 after executing any of steps S412, 414, and 416. In step S418, the controller 22 determines whether the time T is in a range from a lower limit value Tmin to an upper limit value Tmax. In the case of determining YES in step S418, the controller 22 employs the time T determined in one of the steps 412, 414, and 416. In the case where the time T is less than the lower limit value Tmin, the controller 22 corrects the time T to the lower limit value Tmin in step S420. In the case where the time T is greater than the upper limit value Tmax, the controller 22 corrects the time T to the upper limit value Tmax in step S420.

As above, in the electric powered vehicle of the fourth embodiment, the time T is changed according to the traveling state of the electric powered vehicle. As such, the time T is suitably changed to a value suitable to the user. Consequently, when the distance Ls increases and the limitation on the maximum speed Vmax is released while the electric powered vehicle is traveling in the first mode, the maximum speed Vmax increases at the timing optimal for the user. Accordingly, the user can drive with improved comfort.

In the fourth embodiment, the time T is adjusted in steps S412, 414, and 416. However, the timing to increase the maximum speed Vmax may be adjusted by changing other parameters in the first mode, such as the first reference value Ls1 and a shape of the graph G1. For example, in the case of slowing the timing to increase the maximum speed Vmax, the first reference value Ls1 may be extended. Further, in the case of advancing the timing to increase the maximum speed Vmax, the first reference value Ls1 may be shortened.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An electric powered vehicle, comprising:
    an obstruction sensor configured to detect an obstruction and a distance to the obstruction;
    a GPS configured to detect a position of the electric powered vehicle;
    a controller configured to:
        switch between a first mode and a second mode,
        in the first mode, when the distance is shorter than a first reference value, limit a maximum speed of the electric powered vehicle to a value that is lower than the maximum speed applied when the distance is longer than the first reference value,
        in the second mode, when the distance is shorter than a second reference value, limit the maximum speed to a value that is lower than the maximum speed applied when the distance is longer than the second reference value,
        when the distance changes from shorter than both of the first reference value and the second reference value to longer than both of the first reference value and the second reference value, increase the maximum speed at a timing in the second mode before a timing in the first mode, and
        store a map in which a first area and a second area are determined, the first mode being applied in the first area and the second mode being applied in the second area,
    wherein the switch is configured to switch between the first mode and the second mode based on the map and the position detected by the GPS;
    wherein the controller is further configured to:
    when a frequency of execution and release of the limitation is higher than a threshold value, set an area including the position detected by the GPS as the first area in the map, and
    when the frequency of the execution and the release of the limitation is lower than the threshold value, set an area including the position detected by the GPS as the second area in the map.

2. An electric powered vehicle, comprising:
    an obstruction sensor configured to detect an obstruction and a distance to the obstruction;
    a switch configured to switch between a first mode and a second mode;
    a controller configured to:
        in the first mode, when the distance is shorter than a first reference value, limit a maximum speed of the electric powered vehicle to a value that is lower than the maximum speed applied when the distance is longer than the first reference value,
        in the second mode, when the distance is shorter than a second reference value, limit the maximum speed to a value that is lower than the maximum speed applied when the distance is longer than the second reference value, and
        when the distance changes from shorter than both of the first reference value and the second reference value to longer than both of the first reference value and the second reference value, increase the maximum speed at a timing in the second mode before a timing in the first mode; and
    an accelerator,
    wherein, when an operation frequency of the accelerator is higher than a first predetermined value in the first mode, the controller shortens a standby time such that the maximum speed is increased at a timing before a current timing when the distance changes from a value shorter than the first reference value to a value longer than the first reference value in the first mode.

3. An electric powered vehicle, comprising:
    an obstruction sensor configured to detect an obstruction and a distance to the obstruction;
    a switch configured to switch between a first mode and a second mode;
    a controller configured to:
        in the first mode, where the distance is shorter than a first reference value, limit a maximum speed of the electric powered vehicle to a value that is lower than the maximum speed applied when the distance is longer than the first reference value,
        in the second mode, where the distance is shorter than a second reference value, limit the maximum speed to a value that is lower than the maximum speed applied when the distance is longer than the second reference value, and
        when the distance changes from shorter than both of the first reference value and the second reference value to longer than both of the first reference value and the second reference value, increase the maximum speed at a timing in the second mode before a timing in the first mode; and a brake, wherein, when an operation frequency of the brake is higher than a second predetermined value in the first mode, the controller lengthens a standby time such that the maximum speed is increased at a timing after a current timing when the distance changes from a value shorter than the first reference value to a value longer than the first reference value in the first mode.

* * * * *